C. E. SHREVE.
MILK PAIL.
APPLICATION FILED DEC. 17, 1908.
940,372.
Patented Nov. 16, 1909.
2 SHEETS—SHEET 1.
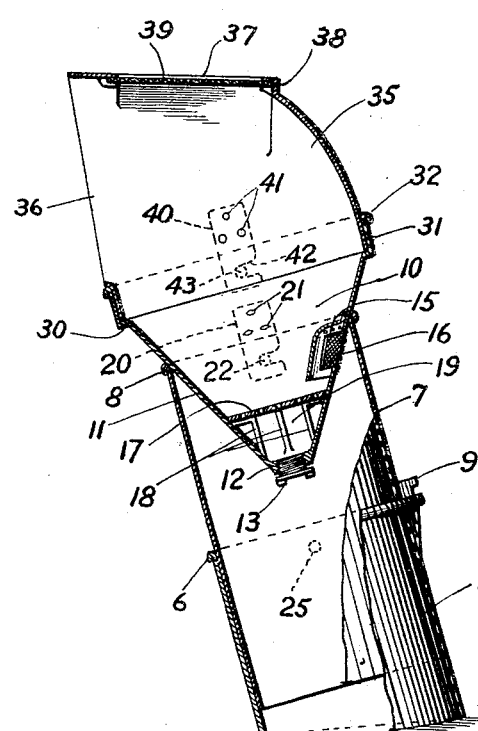
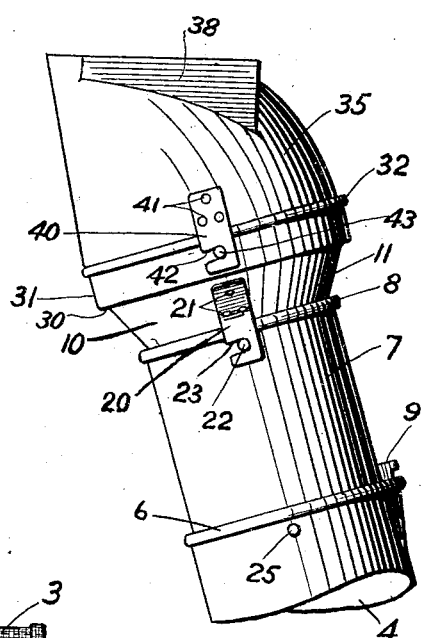
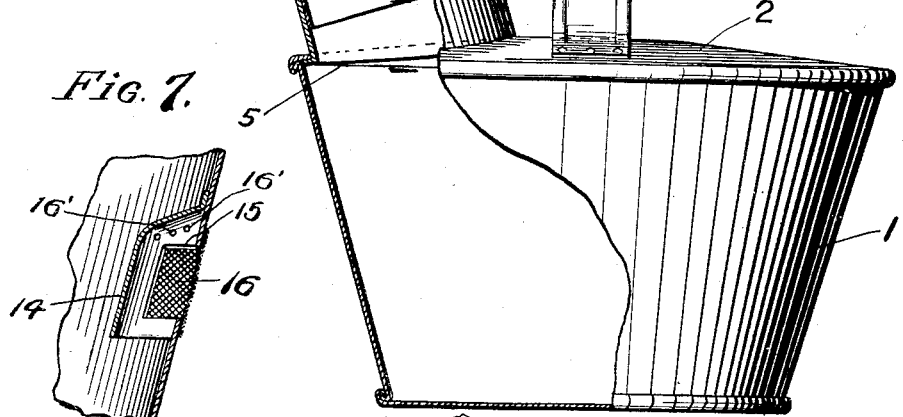
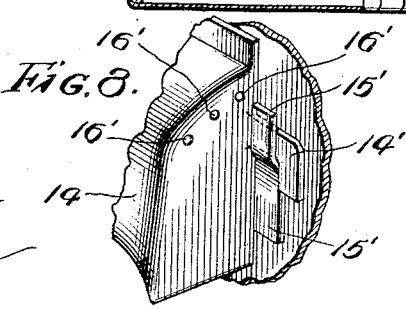
WITNESSES:
Rob't R. Mitchel
A. I. Gardner
INVENTOR
Caleb E. Shreve
BY I. Imee Petts
ATTORNEY.

UNITED STATES PATENT OFFICE.

CALEB E. SHREVE, OF ATLANTIC CITY, NEW JERSEY.

MILK-PAIL.

940,372.

Specification of Letters Patent. Patented Nov. 16, 1909.

Application filed December 17, 1908. Serial No. 467,927.

*To all whom it may concern:*

Be it known that I, CALEB E. SHREVE, a citizen of the United States, and a resident of Atlantic City, State of New Jersey, have invented certain new and useful Improvements in Milk-Pails, of which the following is a full, clear, and exact description, reference being had to the accompanying drawings, forming a part of this specifica10 tion.

The main objects of this invention are to provide a sanitary milk pail of simple construction, that may be conveniently adjusted to receive the milk during the operation of milking, and that will prevent the milk from being contaminated by foreign matter or by the absorption of unpleasant or unwholesome odors; to provide a sanitary milk pail that may be conveniently taken apart for cleaning; and to provide other improvements as will appear hereinafter.

Figures 3, 4:
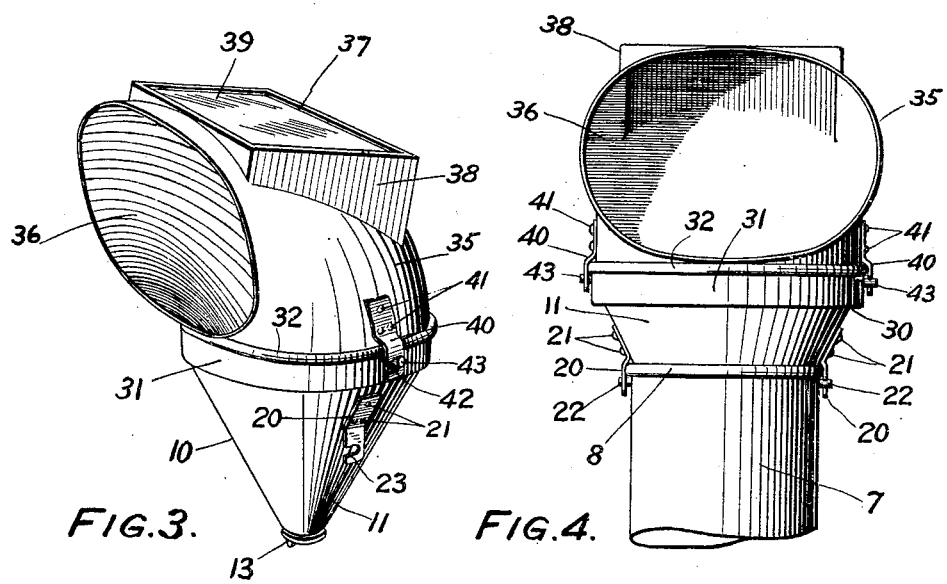
Figures 5, 6:
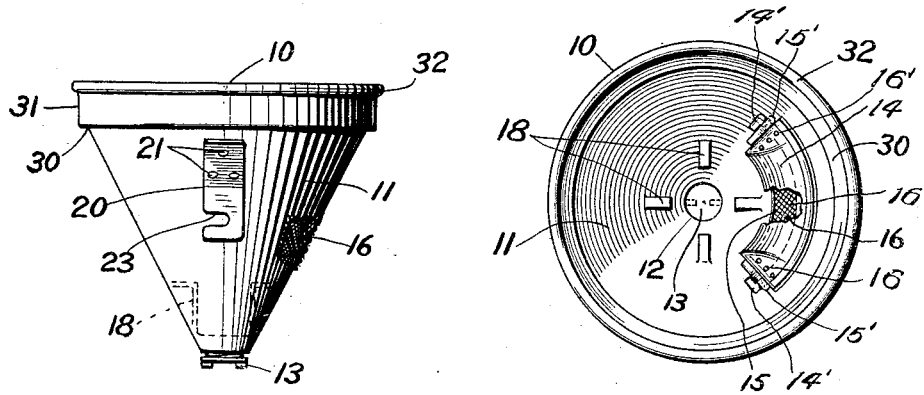
Figure 9:
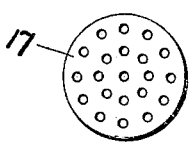

In the accompanying drawings Figure 1 is a side elevation partly in vertical section of a milk pail constructed in accordance with this invention; Fig. 2 a side elevation of a portion of the same; Fig. 3 a perspective of a portion of the same; Fig. 4 a front elevation of the upper portion of the pail; Figs. 5 and 6 are a side elevation and a fragmentary vertical section respectively of a strainer forming part of the pail; Fig. 7 an enlarged fragmentary vertical section of the strainer; Fig. 8, a fragmentary perspective view of a portion of the same; and Fig. 9 a top plan view of a portion of the same.

Referring to the drawings, the pail is provided with a hollow body portion 1 preferably in the form of an inverted truncated cone, having a cover 2 fixed thereon, the cover being provided with a handle 3 rigid therewith, whereby the pail may be carried. Upon one side of the pail and extending upwardly and outwardly from the cover is an inclined cylindrical tubular spout, the lower end of which is rigidly connected to the cover and registers with an opening 5 provided therefor in the cover through which the spout communicates with the interior of the body of the pail. The upper edge of this spout 4 projects outwardly beyond the outer periphery of the body of the pail and is provided with a bead 6 for stiffening the spout.

Telescoping within the spout 4 is a tubular member 7, which also is provided at its upper edge with a bead 8 for stiffening the same. The tubular member 7 is freely movable longitudinally and rotatably in the spout 4 and is held in any desired fixed position by means of a wedge 9 which fits in a downwardly tapering pocket provided therefor in the inner surface of the spout contiguous to the upper edge thereof between the spout and the tubular member 7.

Fitting snugly within the upper edge or mouth of the adjustable tubular member 7 is a strainer 10, comprising a conical body portion or vessel 11 tapering downwardly, and terminating at its lower end in a threaded aperture 12, which is closed by a threaded cap 13. The interior of the strainer communicates with the interior of the telescoping tubular member through an aperture 15, in the upper side of the body portion of the strainer, the aperture being covered with straining material 16, such as wire mesh, or a perforated plate, or other foraminous material. To prevent the streams of milk from passing directly through this screened opening 15 of the strainer, a shield 14 is arranged concentric with the strainer in front of and spaced from the foraminous cover 16, the space between the cover and the shield being closed at its upper side and at its ends but opening downwardly into communication with the body of the strainer. The shield 14 is provided with a laterally extending ear 14' projecting from each end thereof. These ears 14' are slidingly and removably supported by upwardly extending brackets 15' the lower ends of which are fixed to the side of the strainer. The shield 14 may thus be removed from the strainer for cleaning purposes by lifting the shield out of engagement with the brackets. Apertures 16' are provided in one end of the shield adjacent its upper edge to allow the air to pass out from the space under the shield and from the body of the pail as the milk flows in under the lower edges of the shield.

Within the strainer and between the aperture 15 in the side thereof and the bottom of the strainer is a removable perforated plate 17, which rests upon brackets 18, rigid with the body of the strainer and forms a partition between the upper and lower portions of the strainer. This partition acts as a screen to permit any foreign matter in the milk to sift through it and to be retained in the chamber 19, formed by the screen in the lower parts of the strainer, from which the foreign matter may be removed from time to time by inverting said strainer, or by removing the cap 13, which closes the lower end of the strainer.

The strainer is held removably in a fixed position in the telescoping member 7 by means of a pair of downwardly extending catches 20, which are arranged upon opposite sides respectively of the body of the strainer, the upper ends of the catches being rigidly secured to the body of the strainer by means of rivets 21, or otherwise and the lower end of each catch being provided with a transverse recess 23, adapted to engage with a pin 22 fixed upon the telescoping member 7 and extending laterally therefrom. The recesses 23 open in the same direction rotatably so that the catches may be disengaged from the pins 22 by rotating the strainer with respect to the pins. Pins 25 are also provided adjacent the upper edge of the fixed spout 4, projecting outwardly therefrom, and adapted to be engaged by the catches 20 of the strainer, whereby when preferred the telescoping member 7 may be removed and the strainer connected directly in the fixed spout.

The upper portion of the strainer 10 is enlarged to form an upwardly facing internal annular shoulder 30, surrounded by an upwardly projecting cylindrical rim 31, having an outwardly beaded edge 32 for stiffening the same. The rim 31 and shoulder 30 together form a socket for the reception of the lower end of a hood 35, which fits snugly therein.

The hood 35 is in the form of a curved elbow which communicates through its inner end with the upper end of the strainer and which opens outwardly through the aperture 36 in its outer end, which faces obliquely downward, the remainder of the hood being closed. The purpose of the hood is to prevent any foreign matter from falling vertically into the strainer, but to permit of the introduction of the milk during the milking operation through the inclined open outer end of the hood.

For the purpose of enabling easy observation of the milking operation the upper portion of the hood 35, is provided with a rectangular opening 37 surrounded by an outwardly projecting rectangular casing 38 rigid with the hood, the opening being covered by a substantially horizontal pane of glass 39 or other suitable transparent material.

The hood is detachably connected to the strainer by means of a pair of downwardly depending catches 40, the upper ends of which are fastened by means of rivets 41 to the hood, the lower end of each catch being provided with a lateral recess 42, adapted to engage over a pin 43, projecting rigidly from the upper portion of the strainer. The recesses 43 of the catches face in the same direction rotatably so that the hood may be disengaged from the strainer by rotating the hood with respect to the pins.

In using this improved milk pail, the telescoping tubular member 7 is adjusted in the spout by means of the wedge 9 to bring the inlet aperture 36 of the hood into convenient position to receive the milk from the animal. It is to be noted that the hood projects beyond or overhangs the outer periphery of the body of the pail so that the body of the pail does not have to be placed directly under the animal where it would be in danger of being upset, but may be located at one side of the animal. The streams of milk are directed by the operator through the opening 36 into the hood and the first portion of the milk thus introduced falls through the perforated plate 17 and into the bottom compartment 19 of the strainer and as the operation proceeds the plate is gradually submerged and the milk above the plates overflows through the screened aperture 15 and through the telescoping tubular member 7 and spout 4 into the body of the pail. Any foreign matter heavier than milk entrained by the milk settles through the perforated plate and may be removed as previously explained. The perforated plate 17 over the compartment 19 protects the milk in the compartment from being agitated by the incoming streams and facilitates the precipitation of any foreign matter.

The screened aperture 15 in the strainer is preferably located upon the side of the strainer opposite the entrance 36 to the hood 35 where it will be nearest the streams of milk as they fall into the strainer to facilitate the speedy movement of the milk from the strainer into the body of the pail; but the aperture 15 and its shield 14 could be placed in any other position in the side of the strainer above plate 17 without detracting seriously from the efficiency of the strainer.

When it is desired to empty the pail, the telescoping member 7 is removed together with the hood and strainer and the contents of the pail may then be poured out through the spout 4, after which every part of the pail may be conveniently cleaned and kept in a sanitary condition.

In addition to the advantages heretofore mentioned, a further and important advantage of the improved milk pail is that the inlet into the pail through the hood facing downwardly the operator may conveniently, and moreover is required to, direct the streams of milk laterally into the inlet by a movement of the hands laterally, away from the animal being milked, which is a more natural method than the method in which the pressure is applied vertically.

Although I have described only the preferred form in which this invention may be embodied, yet I do not limit myself to this particular form, as various changes might be made in the construction herein set forth, without departing from the spirit of this invention or the scope of the appended claims.

Having thus fully described my invention, I claim and desire to protect by Letters Patent of the United States:

1. A pail provided with an inlet opening and a hood over said opening, the only inlet to said hood facing downwardly, and means arranged to secure said hood and pail by their relative rotation.

2. A pail comprising a body portion and a strainer removably connected thereto and communicating therewith, said strainer being provided with an opening in the lower portion thereof, a closure for said opening, a screened opening in said strainer above said first mentioned opening, and a screen in said strainer between said openings.

3. A pail comprising a body portion, a tubular spout extending upwardly from said body portion, a tubular member telescoping in said spout, a strainer resting removably within the upper end of said telescoping member and locking means carried by said strainer and adapted to engage with means provided therefor upon said telescoping member, or with means provided therefor upon said spout for locking said strainer either upon said telescoping member or upon said spout.

4. A pail comprising a body portion, a tubular spout extending upwardly from said body portion, a tubular member telescoping in said spout, a strainer resting removably within the upper end of said telescoping member, locking means carried by said strainer and adapted to engage with means provided therefor upon said telescoping member, or with means provided therefor upon said spout for locking said strainer either upon said telescoping member, or upon said spout, and a hood having a transparent portion carried by said strainer to protect the inlet thereof.

5. A pail comprising a body portion, a tubular spout projecting therefrom, a tubular member telescoping in said spout, and a wedge engaging in a pocket provided therefor in said spout between said spout and said tubular member for locking said tubular member in position.

6. A pail comprising a body portion, provided with an inlet, and a hood mounted to shield said inlet, said hood being in the form of a hollow elbow, having but a single inlet, and means arranged to secure said hood and pail by their relative rotation.

7. A pail comprising a body portion, a hood communicating with said body portion, means connecting said hood and body portion, and means comprising a tapered wedge arranged to be shifted in the direction of the axis of said connecting means to rigidly secure said hood.

8. A pail comprising a body portion, a hood, a tubular member connecting said hood and body portion, means connecting said hood to said tubular member by their relative rotation, and means comprising a tapered wedge arranged to secure said tubular member to said body portion by their relative movement in parallel relation to the axis of said tubular member.

9. A pail comprising a body portion having an inlet, a hood communicating with said body portion and provided with an inlet aperture having its upper edge projecting beyond its lower edge, and means whereby said hood may be variably secured in rigid relation with said body portion to direct said inlet aperture in variable directions.

10. A pail comprising a body portion, and a strainer having a screened opening communicating with said body portion, and a screen in said strainer between said opening and the bottom of the strainer.

11. A pail comprising a body portion, a strainer having a screened opening communicating with said body portion, and a shield within said strainer over said opening.

12. A pail comprising a body portion, a strainer having a screened opening communicating with said body portion, and a removable shield within said strainer over said opening.

13. A pail comprising a body portion, a strainer having a screened opening communicating with said body portion, and a downwardly opening shield within said strainer over said opening.

14. A pail comprising a strainer having a screened opening communicating with said body portion, a shield within said strainer over said opening, said shield being provided with projecting ears, and upwardly extending brackets fixed in said strainer to engage said ears.

15. A pail comprising a body portion, a strainer having a screened opening communicating with said body portion, a shield within said strainer over said opening and a foraminous plate between said opening and the bottom of the strainer.

16. In a milking pail, a substantially closed body portion, an inlet therefor provided with a suitable strainer and a shield for said inlet.

17. A pail comprising a body portion, a tubular spout extending upwardly from said body portion, a tubular member telescoping with said spout, a strainer carried by said telescoping member, and a hood having a transparent portion carried by said strainer to protect the inlet thereof.

18. A pail comprising a body portion, a tubular spout extending outwardly from said body portion, a tubular member telescoping with the outer end of said spout, a strainer carried by said last mentioned tubular member, and a hood having a transparent portion carried by said strainer to protect the inlet thereof.

19. A pail comprising a body portion, a tubular spout extending upwardly from said body portion, a tubular member telescoping with the outer end of said spout, a strainer carried by said telescoping member, locking means whereby said strainer may be locked either to said spout or to said telescoping member, and a hood having a transparent portion carried by said strainer to protect the inlet thereof.

20. A pail comprising a body portion, a strainer having an opening communicating with said body portion and a perforated shield within said strainer over said opening.

21. The combination with a milk pail provided with an inlet, of a closure for said inlet having a lateral port in communication with the interior of said pail, and a shield over said port, exterior to said port.

22. The combination with a milk pail having an inlet, of an inverted cone shaped vessel closing said inlet, said vessel having a lateral port in communication with the interior of said pail, and a perforated shield over said port, exterior to said port.

23. A closure for a milk receptacle, comprising a vessel having a lateral port and a shield within said vessel over said port, and exterior thereto with respect to the direction of flow therethrough.

24. A closure for a milk receptacle, comprising a tapering vessel provided with a lateral port, and a shield within said vessel over said port, having its lower edge extending below said port, exterior thereto with respect to the direction of flow therethrough.

25. A closure for a milk receptacle, comprising a vessel provided with a lateral port, and a downwardly extending shield disposed exterior with respect to said port within said vessel over said port, and opening downwardly below said port.

26. A closure for a milk receptacle, comprising a vessel having a lateral port, and a sediment receptacle communicating with said vessel beneath said port, and a foraminous diaphragm independent of said port covering said sediment receptacle.

27. A closure for a milk receptacle, comprising a vessel having a lateral port, a hood within said vessel over said port, and a sediment receptacle communicating with said vessel beneath said port, and a diaphragm partially separating said receptacle from said vessel.

In witness whereof I have hereunto set my hand this 15th day of December A. D. 1908.

CALEB E. SHREVE.

Witnesses:
 HARRY COBB KENNEDY,
 JOHN B. RUTHERFORD.